Aug. 7, 1962 S. J. SHORES 3,048,431
DRILL ROD COUPLING
Filed Feb. 6, 1961 2 Sheets-Sheet 1
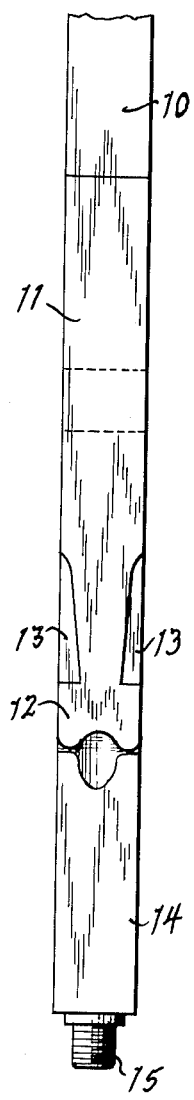
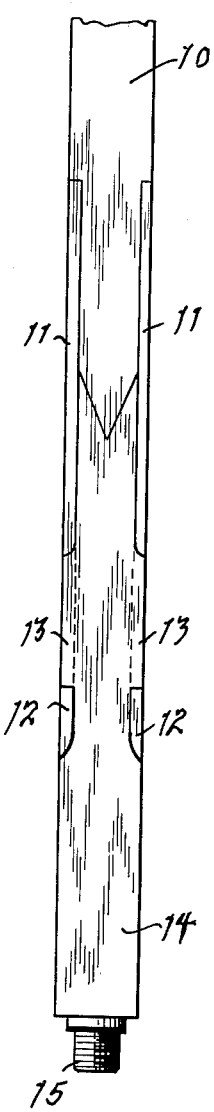
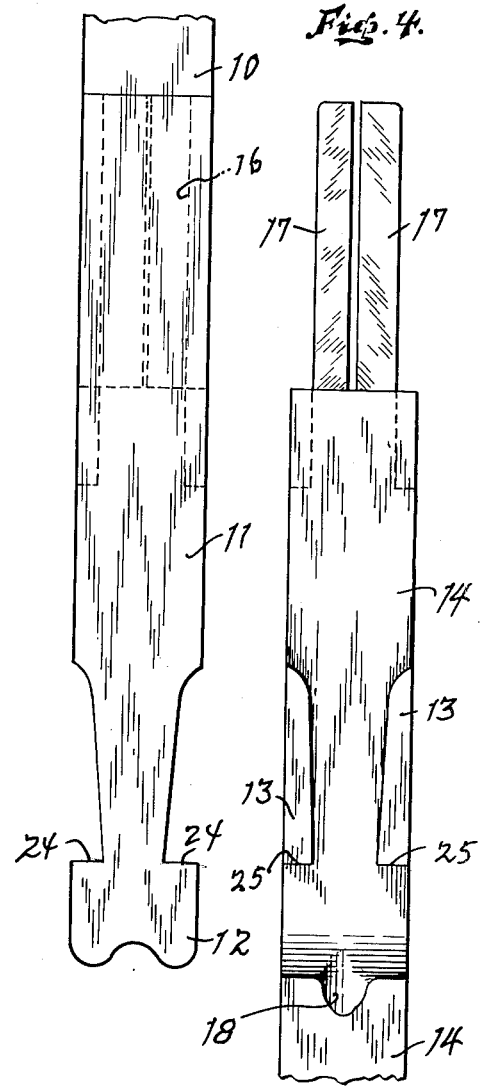
INVENTOR.
SAMUEL J. SHORES.
BY
ATTORNEY Aug. 7, 1962
S. J. SHORES
3,048,431
DRILL ROD COUPLING
Filed Feb. 6, 1961
2 Sheets-Sheet 2
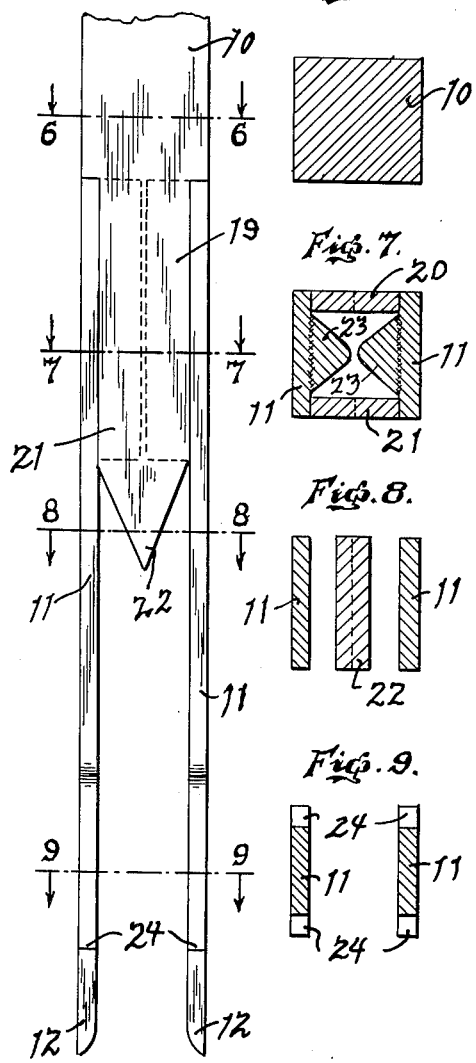
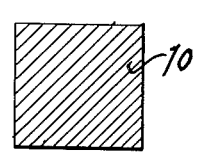
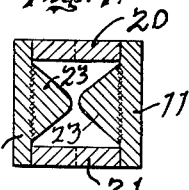
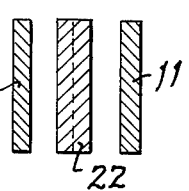
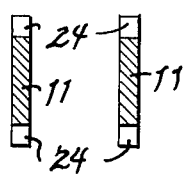
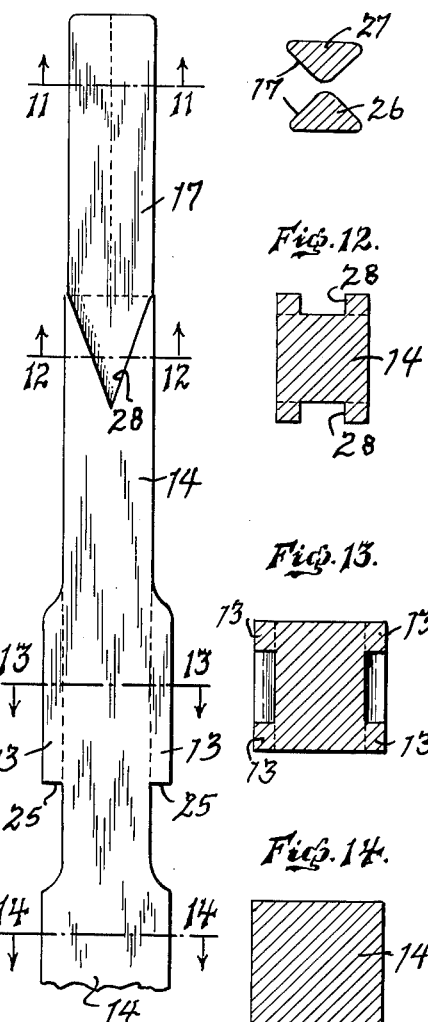
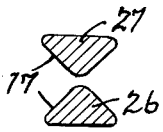
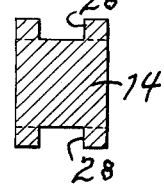
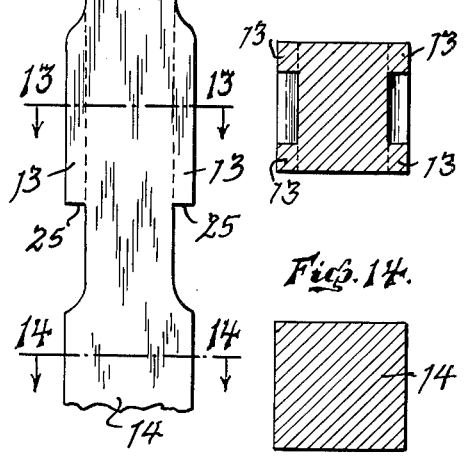
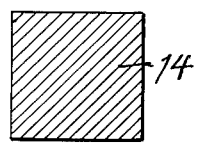
INVENTOR.
SAMUEL J. SHORES.
BY
ATTORNEY

United States Patent Office 3,048,431
Patented Aug. 7, 1962

3,048,431
DRILL ROD COUPLING
Samuel J. Shores, 2033 Mason St., San Pablo 10, Calif.
Filed Feb. 6, 1961, Ser. No. 87,451
2 Claims. (Cl. 287—103)

My present invention relates to well drilling apparatus and more particularly to a coupling for drill rods of square cross-section.

An object of the invention is to provide a coupling for drill rods of square cross-section by which lengths of drill rod may be coupled together with a splined and snap action as the parts are moved longitudinally into cooperating relation with each other.

Another object of the invention is to provide a novel form of coupling in which the meeting ends of lengths of drill rod may be connected together with a splined coupling to prevent relative rotation between the parts and having a spring latch means for holding the lengths of drill rod against axial separation when fully coupled together.

Other objects and advantages will be in part evident to those skilled in the art and in part pointed out hereinafter in connection with the accompanying drawing, wherein there is shown by way of illustration and not of limitation a preferred embodiment of the invention.

In the drawing, wherein like numerals refer to like parts throughout the several views:

FIGURE 1 is a side view looking in one direction at the coupling,

FIGURE 2 is another side view rotated 90° from the showing of FIGURE 1,

FIGURE 3 is a fragmentary view similar to FIGURE 1 showing the upper one of the coupling members, FIGURE 4 is a fragmentary view showing the lower one of the coupling members as shown in FIGURE 1, FIGURE 5 is a side view of the upper coupling member as shown in FIGURE 2, FIGURES 6, 7, 8 and 9 are sectional views taken respectively along the four corresponding section indicating lines of FIGURE 5.

FIGURE 10 is a side view of the lower coupling portion as shown in FIGURE 2 of the drawings, and FIGURES 11, 12, 13 and 14 are horizontal sectional views taken respectively along the corresponding section indicating lines of FIGURE 10.

My improved coupling will be found particularly suited for use in coupling lengths of drill rod of square cross-section such as are employed in the drilling of shallow wells for water or the like. In operation the drill rod extends and moves downwardly through a power operated rotary driving gear or chuck that is mounted upon the surface below which the drilling is to occur. In this operation the depth of the well often requires several lengths of drill rod and at the extreme lower end of the drill rod there is means by which an earth drilling bit may be attached. The coupling as shown in the drawings contemplates an assembly by which the lengths of drill rod may be connected together by parts that are all within the outer dimensional limits of a square drill rod.

In FIGURES 1 and 2 there is shown an upper length of drill rod 10 having oppositely secured spring clips 11 that have shouldered ends 12 which are adapted to interlock with bosses 13 that are formed upon a lower length of drill rod 14. The formation of the bosses 13 upon the lower length of drill rod 14 is accomplished by milling away that portion of the lower length of drill rod 14 which is encompassed by the downwardly extending ends of the spring clips 11 which carry the shouldered end portions 12. At the lower end of the rod 14 there is a threaded extension 15 by which a threaded drill bit may be attached to the assembled length of drill rod. The other side of the assembly as shown in FIGURE 1 is identical to that here shown and the other side of the assembly as shown in FIGURE 2 is identical to that here shown.

As is more clearly shown in FIGURE 3, the upper length of drill rod 10 with its spring clips 11 is also provided with a central axially extending cavity 16 of hour-glass cross-section, and as shown in FIGURE 4 of the drawings the lower coupling member with its bosses 13 is provided with upwardly extending triangular tongues 17 that are adapted and arranged to extend into the cavity of hour-glass cross-section as formed in the upper length 10 of the drill rod. In this figure of the drawings it will be noted that the milling upon the lower length of drill rod 14 is curved or feathered outwardly so as to accommodate the shouldered portions 12 carried by the spring clips 11 and centrally at this point the lower length of drill rod 14 is cut away as at 18 to permit the insertion of a tool for moving the spring clips 11 out of interlocking relation with the bosses 13 upon the lower length of drill rod 14 and thus permit axial separation of the upper and lower coupling members 10 and 14.

Upon reference to FIGURE 5 of the drawings and also the horizontal sectional views, FIGURES 6, 7, 8 and 9 as related thereto, it will be noted that the upper portion of the coupling consists mainly of the projecting lower end 19 of the rod 10 which is reduced in thickness to an amount equal to twice the thickness of the spring fingers 11. As indicated in FIGURE 7 of the drawing, the spring fingers 11 are secured at their sides to two tongue like extensions 20 and 21 which are pointed at their lower ends as at 22. In this assembly there is normally provided a spline forming opening extending axially between the tongues 20 and 21 and the two spring fingers 11. However, as an additional feature tending to strengthen the parts at this point the spring fingers 11 are shown as each having elongated spline forming members 23 of triangular cross-section welded to their inner surfaces so that there is in effect produced a spline forming cavity of hour-glass cross-section in the upper portion of the coupling.

By now referring to FIGURE 9 of the drawing, which shows in cross-section the two spaced spring clips 11 just above the point where the enlarged or shouldered ends 12 are formed thereupon, it will be noted that these shouldered ends 12 extend at a right angle to the surface of the clips and provide four shoulder forming surfaces that are adapted to abut with correspondingly disposed abutment surfaces 25 that are formed upon the lower coupling member 14 by the bosses 13 formed thereupon. The spring fingers 11 snap or ride over the bosses 13 of the lower coupling member 14 when the upper coupling member 10 is brought into full coupling relation. In this way the shoulders 24 formed upon the enlarged head 12 of the spring fingers 11 will cooperate with the abutment forming surfaces 25 of the bosses 13 carried by the lower coupling member 14 and thus secure the members 10 and 14 against separation.

Reference is now made to FIGURE 10 and the related cross-section views of FIGURES 11, 12, 13 and 14 for a more detailed description of the lower portion of the coupling. In this showing the upper end of the coupling member 14 is provided with two opposed tongues 26 and 27 of triangular cross-section which as shown in FIGURE 11 are related to each other so as to project into the cavity of hour-glass cross-section as provided for and shown in FIGURE 7 of the drawings. Immediately below these tongues the coupling member 14 extends outwardly from the outer surfaces of the tongues 26 and 27 and there is provided at this point a V-notch 28 into which the pointed ends 22 of the tongue like members 20 and 21 of the upper coupling member 10 project. In this manner the two parts of the coupling are additionally held against relative twisting displacement. Then as the spring clips 11 are forced downwardly over the opposite sides of the lower coupling member 14 they will spring outwardly so as to pass over the bosses 13 formed thereupon and as soon as the shoulders 24 come into register with the abutment forming surfaces 25 of the bosses 13 the spring clips will snap into place and thus firmly secure the coupling members together against separation by any pulling or pushing force that may be exerted in a direction parallel with the axis of the drill rod.

While I have, for the sake of clearness and in order to disclose my invention so that the same can be readily undersood, described and illustrated a specific form and arrangement, I desire to have it understood that this invention is not limited to the specific forms disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a mechanical coupling for lengths of drill rod, the combination of a length of drill rod having a central spline forming socket of square cross-section extending inwardly from the end thereof, oppositely disposed spring like fingers extending in spaced relation outwardly from the end of said length of drill rod, said spring like fingers having laterally extending shouldered portions at the ends thereof, a second length of drill rod having a tongue portion of square cross-section extending into the spline forming socket of said first length of drill rod, and said second length of drill rod being milled away on opposite sides to provide recesses corresponding with the outline of the shouldered portion of said spring like fingers and provide abutments against which the shouldered portions of the spring like fingers carried by said first length of drill rod will abut and lock said lengths of drill rod together as a unit when said lengths of drill rod are moved axially into fully coupled relation.

2. In a coupling for lengths of drill rod, the combination of a length of drill rod having a central spline forming recess of spline forming cross-section extending inwardly from the end thereof, oppositely disposed outwardly flexible flat spring like fingers extending in spaced relation outwardly from the end of said length of drill rod, said spring like fingers being reduced in width intermediate their ends to provide shouldered portions at the end thereof, a second length of drill rod having a projecting spline portion adapted and arranged to extend into the central spline forming recess of said first length of drill rod, and said second length of drill rod being milled away on opposite sides to provide accommodating space for the spring like finger and the shouldered portions thereof within the normal cross-sectional dimensions of the drill rod, whereby spaced abutments will be formed upon the surface thereof against which the shouldered portions of said spring fingers will abut and retain said lengths of drill rod in drill driving relation when said lengths of drill rod are moved axially into full engagement with each other.

References Cited in the file of this patent
UNITED STATES PATENTS
889,786    Keiner _____ June 2, 1908